(12) United States Patent
Kempinski

(10) Patent No.: US 10,635,167 B2
(45) Date of Patent: Apr. 28, 2020

(54) SMOOTH PURSUIT GAZE TRACKING

(71) Applicant: UMOOVE SERVICES LTD., Jerusalem (IL)

(72) Inventor: Yitzchak Kempinski, Geva Binyamin (IL)

(73) Assignee: Umoove Services Ltd., Jerusalem (IL)

( * ) Notice: Subject to any disclaimer, the term of this patent is extended or adjusted under 35 U.S.C. 154(b) by 389 days.

(21) Appl. No.: 14/894,548

(22) PCT Filed: Jun. 1, 2014

(86) PCT No.: PCT/IL2014/050491
§ 371 (c)(1),
(2) Date: Nov. 30, 2015

(87) PCT Pub. No.: WO2014/192001
PCT Pub. Date: Dec. 4, 2014

(65) Prior Publication Data
US 2016/0109945 A1 Apr. 21, 2016

Related U.S. Application Data

(60) Provisional application No. 61/828,688, filed on May 30, 2013, provisional application No. 61/830,252, filed on Jun. 3, 2013.

(51) Int. Cl.
*G06F 3/01* (2006.01)
*G06K 9/00* (2006.01)

(52) U.S. Cl.
CPC ......... *G06F 3/013* (2013.01); *G06K 9/00597* (2013.01); *G06K 9/00906* (2013.01)

(58) Field of Classification Search
USPC ................................... 348/78, 153
See application file for complete search history.

(56) References Cited

U.S. PATENT DOCUMENTS

| | | | |
|---|---|---|---|
| 5,360,971 A | 11/1994 | Kaufman et al. | |
| 6,659,611 B2 | 12/2003 | Amir et al. | |
| 7,657,062 B2 | 2/2010 | Pilu | |
| 8,437,513 B1 * | 5/2013 | Derakhshani ...... | G06K 9/00597 382/115 |

(Continued)

FOREIGN PATENT DOCUMENTS

WO WO 2013/059940 5/2013

OTHER PUBLICATIONS

International Search Report of Application No. PCT/IL2014/050491 dated Mar. 31, 2015.

*Primary Examiner* — Nigar Chowdhury
(74) *Attorney, Agent, or Firm* — Pearl Cohen Zedek Latzer Baratz LLP

(57) ABSTRACT

A system and method to calibrate a gaze point on a screen of an eye as the eye watches an object move on the screen. A movement of an eye may be tracked in a series of images, and a pattern of the movement of the eye may be detected. Detection of a pattern of eye movements that is associated with watching the moving object on a screen may be an indication that the eye was watching the object at the time that the pattern of eye movements was detected. The identified gaze point may be part of a calibration for purpose of gaze tracking. The detected pattern may be included in an indication that the viewer looked at the moving object.

19 Claims, 4 Drawing Sheets

(56) References Cited

U.S. PATENT DOCUMENTS

| | | | | |
|---|---|---|---|---|
| 8,913,004 | B1* | 12/2014 | Bozarth | G06K 9/00604 345/156 |
| 2007/0265507 | A1* | 11/2007 | de Lemos | A61B 3/113 600/300 |
| 2008/0104415 | A1* | 5/2008 | Palti-Wasserman | G06F 21/32 713/186 |
| 2010/0010370 | A1* | 1/2010 | De Lemos | A61B 3/112 600/558 |
| 2011/0006978 | A1* | 1/2011 | Yuan | G06F 3/013 345/156 |
| 2012/0105486 | A1* | 5/2012 | Lankford | G06F 3/013 345/661 |
| 2012/0154751 | A1* | 6/2012 | Pelah | A61B 3/0041 351/224 |
| 2013/0156265 | A1* | 6/2013 | Hennessy | A61B 3/113 382/103 |
| 2013/0222638 | A1* | 8/2013 | Wheeler | G06F 3/013 348/231.2 |
| 2013/0222764 | A1* | 8/2013 | Thompson | A61B 3/103 351/209 |
| 2014/0282646 | A1* | 9/2014 | McCoy | G06K 9/00597 725/12 |
| 2014/0337023 | A1* | 11/2014 | McCulloch | G06F 1/163 704/235 |

* cited by examiner

SMOOTH PURSUIT GAZE TRACKING

FIELD OF THE INVENTION

The present invention relates to application and calibration of smooth pursuit gaze tracking.

BACKGROUND OF THE INVENTION

Eye tracking techniques are applied in a variety of circumstances. Eye tracking may include determination of a point of gaze at which a person's eyes are directed at an instant of time. For example, a sequence of frames or images of the eye may be analyzed to determine a direction toward which an eye is looking. Such a gaze tracking technique may include determining a position of an identifiable region of the eye, such as a pupil or iris. A determined position of the identifiable region of the eye relative to a determined position of another region or feature of the eye or face may be analyzed to yield a direction of the gaze.

A determined direction of a gaze may be of use in different circumstances. For example, gaze tracking may be utilized in psychological or physiological research. Gaze tracking may be utilized in coordination with a computing or communications device such as a computer or smartphone. For example, gaze tracking may provide information to a content provider regarding which displayed content has been viewed by a user of the device. Gaze tracking may be utilized to control the device. For example, gaze tracking may be utilized in hands-free control of scrolling or selection of displayed content.

Determination of a direction or point of gaze may require calibration. For example, a viewer may be requested to look at displayed object or other object at a known position (e.g., relative to a camera or other device that is tracking eye movements). A user or viewer may consider such a process to be distracting, annoying, or otherwise distasteful.

SUMMARY OF THE INVENTION

Embodiments of the invention may include a method for calibrating a gaze of a viewer of an electronic screen by displaying on the electronic screen a moving object during a time period; acquiring during the same time period images of an eye of a viewer of the screen; identifying a pattern of movements of the eye during that time period, where the pattern is indicative of viewing the moving object by the eye; and calibrating a gaze point of the eye during the time period with a position on the screen of the object during the time period. In some embodiments, the movements of the eye may include movements of a pupil or an iris of the eye. In some embodiments, a rate of movement of the object on the screen may be or be associated with a rate that induces smooth pursuit of the eye in gazing at the object. In some embodiments the calibrating includes associating the gaze point of the eye from an image with the position of the object on the screen at a time of acquisition of the image.

Some embodiments may includes storing calibration data derived from the calibration and replacing the stored calibration data upon a repetition of the method. Some embodiments may include selecting the object from among a group of objects that are contextually related to a scene displayed to the user on the screen during the time period. Some embodiments may include repeating the method, where the object that is displayed in the repeated method is different from the object that was displayed in a previous execution of the method. Some embodiments may include repeating the method upon a signal from a processor that the calibration of the gaze has been compromised, or at a fixed periodicity during a period of an operation of a gaze tracking function associated with the screen. In some embodiments, the displaying is unaccompanied by a signal or instruction to the viewer to look at the moving object. In some embodiments, the pattern includes a smooth pursuit movement of the eye. In some embodiments, the method may include determining that the viewer has viewed content that is displayed concurrently with the moving object upon the identifying of the pattern.

Embodiments of the invention include a method for determining if a user of an electronic display screen has viewed content that is displayed on the screen by displaying on the screen a moving object concurrent with a time period during which the content is displayed; acquiring during the same time period of images of an eye of the user; and determining that the user has viewed the content upon identifying a pattern of movement of the eye that is indicative of smooth pursuit by the eye during the same time period. In some embodiments, the content includes an advertisement. In some embodiments the moving object is displayed on the screen proximate to the content. In some embodiments, the method may include calibrating a gaze point of the eye during the time period with a position on the screen of the moving object during the time period.

Embodiments of the invention may include a gaze tracking device having a display screen; an eye tracker to track movement of an eye of a user who is viewing the screen; a processor in communication with a computer readable medium that includes a set of instructions that are configured to carry out the set of instructions to display on the screen a moving object while concurrently operating the eye tracker to track movement of the eye; concurrently with the display of the object, operate the eye tracker to detect successive positions of a feature of the eye of the user; identify a movement of the eye that is indicative of viewing of the object; and calibrate a gaze point of the eye by associating a tracked position of the eye feature with a concurrent position of the object.

In some embodiments, the eye tracker includes a camera that is configured to acquire an image of the eye when the user is viewing the screen. In some embodiments instructions are configured to determine that the user has viewed content that is displayed on the screen concurrently with the moving object upon identifying the movement of the eye. In some embodiments, the content includes an advertisement. In some embodiments, the device may be part of a cellular telephone.

BRIEF DESCRIPTION OF THE DRAWINGS

In order to better understand the present invention, and appreciate its practical applications, the following Figures are provided and referenced hereafter. It should be noted that the Figures are given as examples only and in no way limit the scope of the invention. Like components are denoted by like reference numerals.

Figure 1:
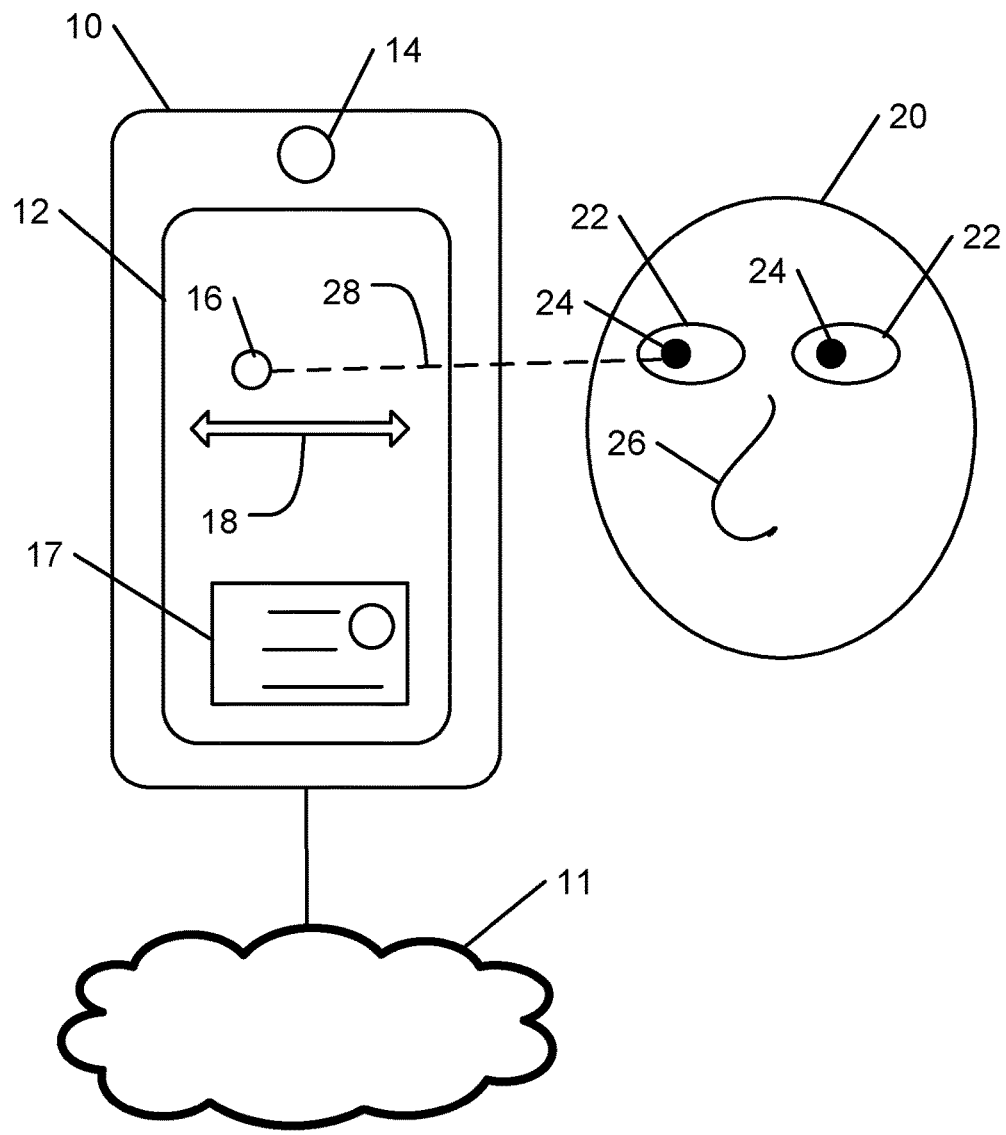
FIG. 1 is a schematic illustration of use of a device for gaze tracking, in accordance with an embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently.

In accordance with an embodiment of the present invention, gaze tracking may be utilized to determine that a user is viewing moving content that is displayed on a screen. For example, the displayed moving content may include a displayed object that is moving on a screen. An eye tracker, or eye tracking device or functionality, may detect a position or orientation of the user's eyes concurrent with the motion of the displayed moving content. For example, the eye tracking device or functionality may include acquisition over time of a sequence of frames or images that include an image of one or both eyes of the user. Such images may be acquired by a camera or other imaging device that is associated with the display screen. For example, the display screen and imaging device may be incorporated into a single mobile or stationary computing or communications device. Such a device may include, for example, a mobile telephone or smartphone, a desktop computer, a laptop, tablet, or handheld computer, or another device. The device may include a publicly or otherwise displayed electronic billboard with an associated eye tracker.

Analysis of the images may reveal a pattern of eye movement. For example, the eye tracking may detect a position or motion of a feature of the user's eye, such as an iris, pupil, or other feature. A detected movement of the eye may be consistent with smooth pursuit of a viewed object. For example, the detected movement may be in the form of motion with a constant speed or angular speed without saccades. Such detected smooth pursuit may be determined to be concurrent with (e.g., occurring during a same time period as) the motion of the displayed moving content. In such a case, the detected smooth pursuit may be indicative of viewing of the displayed moving content by the user. For example, the displayed moving content may be associated with (e.g., displayed as part of) an advertisement, notice, or other content. A provider of the content may wish to verify that the content was viewed. Detection of smooth pursuit eye movement concurrent with display of the moving content may be indicative that the user viewed the content.

In accordance with an embodiment of the present invention, a determination of a direction of gaze of a viewer or user who is viewing a display screen may be calibrated. The calibration procedure includes tracking a position of an eye of the user during a time period while concurrently, during the same time period, displaying an image of a moving object on a display screen. The speed of the motion of the moving object image may be determined in consideration of a detected, estimated, or otherwise known or assumed distance of the user's eyes from the display screen. Motion of the object may be at such an angular speed (e.g., less than 30 degrees per second) as to be likely to initiate smooth pursuit eye movement by a user who is viewing the moving displayed object. Tracking the eye includes acquiring or capturing, by a camera, video camera, or other imaging device (any of which is herein referred to as a camera), a sequence of frames or images that include the eye. A position of a feature of the eye image, such as a pupil or iris, is indicative of a direction of gaze of the user. Analysis of each frame may determine the position of the eye feature within that frame. A pattern of movement of the imaged eye or eye feature during the time period may be identified. The identified pattern may be indicative of or associated with viewing by the eye of the moving displayed object. For example, the identified pattern may be consistent with smooth pursuit eye movement. Upon detection of one or more indications of a smooth pursuit of the eye, or one or more other patterns of eye movement that are associated with the eye following the moving object, it may be assumed that the user's eye is consciously or unconsciously following the displayed image of the moving object. Thus, it may be assumed that the direction or point of gaze at the time of acquisition of a frame is the direction or gaze point of the eye to the displayed image of the moving object at a time concurrent or associated with the time of acquisition. A position of the imaged eye feature in a frame and a point of gaze of such eye at the time of the capture of the frame may thus be associated or correlated with the position of the displayed image of the moving object concurrent with the time that the frame was acquired. The association or correlation may serve to calibrate tracking the direction or point of gaze as determined by the position of the image of the eye feature. Thus, a gaze point of the eye at a time during the time period may be calibrated with a concurrent position of the displayed object on the display screen. A position of the object on the screen at a time of a series of acquired or captured frames may also be used.

Gaze tracking calibration may be performed continuously, periodically, in response to a predetermined event, in response to a command that is initiated by the user, or otherwise from time to time. For example, gaze tracking calibration may be repeated with a fixed periodicity during gaze tracking at predetermined time intervals. Gaze tracking calibration may be performed whenever an image of a moving object is displayed. Gaze tracking calibration may be performed when a program or application that operates in accordance with gaze tracking is started, initiated, brought to the foreground of the display, or otherwise activated. Gaze tracking calibration may be performed when a change in user is indicated, when a change in the manner in which the user views the screen is indicated (e.g., putting on or removing glasses, change in lighting, or otherwise), when a significant (e.g., as determined by comparison to a threshold or other predetermined criterion) change in distance between a camera that performs gaze tracking and the user's eye is detected, or other relevant event that is indicative of a previous calibration having been lost, compromised, or is otherwise invalid. An event may be detected automatically by analysis of acquired images or frames, or may be indicated by a deliberate action by the user (e.g., operation of a control) or by for example one or more functions that may be executed by a processor during, concurrent with, or proximate to a time of the display of the object. For example, the displayed object may be contextually related to, part of, or associated with one or more scenes being displayed on a screen. In such a case, displaying of the moving object need not be accompanied by a signal or other notification to the user to view or look at the moving object.

Such a calibration may determine, confirm, correct, or improve accuracy of a determination of point of gaze of eyes from an image of the user's eye or eyes. In some cases, gaze tracking calibration may enable eliminating or reducing any need to identify a position of an eye feature relative to the position of another facial feature (e.g., that does not move together with the eye, such as an eyelid, eyebrow, nose, or other facial feature).

Accurate calibration may enable accurate utilization of gaze tracking to control a device. For example, gaze tracking may be used in hands-free control of displayed content on the display screen. In some cases, gaze tracking may be used to scroll displayed content when the user's gaze is tracked to the vicinity of an edge or boundary of the display screen. Gaze tracking may be used to select a displayed object, such as a screen control. Gaze tracking may be used to move a displayed object relative to a displayed background.

Calibration, in accordance with an embodiment of the present invention, may be performed unobtrusively by incorporation into content that is otherwise displayed. For example, calibration may be performed when a screen object is moved as part of the normal context of a game, animation, video sequence, progress bar, or other displayed graphic. Such unobtrusive calibration may avoid or reduce the introduction of displaying solely for the purpose of calibrating gaze tracking.

Gaze tracking, whether calibrated or not, may be used to determine if a user or viewer of a screen has viewed a content that is displayed on the screen. A moving object may be displayed as moving on the screen during a time period. During the time period, the user's eye may be tracked. For example, a plurality of images of the eye may be acquired during the time period. Tracking of the user's eye may identify a pattern of movement of the eye during the time period during which the moving object is displayed. Matching of the time of the detection of the smooth pursuit with the time of the appearance on the screen of the moving content may eliminate or reduce a need to calibrate the eye tracking, e.g., to calibrate a tracked position of an eye feature with a gaze direction.

The pattern may be associated with or may be considered to be indicative of viewing of the displayed moving object by the eye. Thus, viewing by the user of the moving content may be detected. For example, if the moving object is associated with a displayed advertisement, detected viewing by the user may be indicative that the user had viewed the advertisement. Detection of viewing may be communicated to a remote party, such as an advertiser, advertising agency, advertisement rating organization, a billing department, or other party.

Detection of viewing of the displayed content by a user or by a plurality of users (e.g., of different devices) may enable detection of patterns, modes, or characteristics of viewing of the displayed content. For example, a number of viewers of the displayed content (e.g., an advertisement) may be identified. Detection of viewing by gaze tracking may be correlated with other indications of viewing. Such other indications of viewing may include, for example, following a link that is included in the displayed content, responses to questionnaires or polls related to the displayed content, or other indications.

Figure 2:
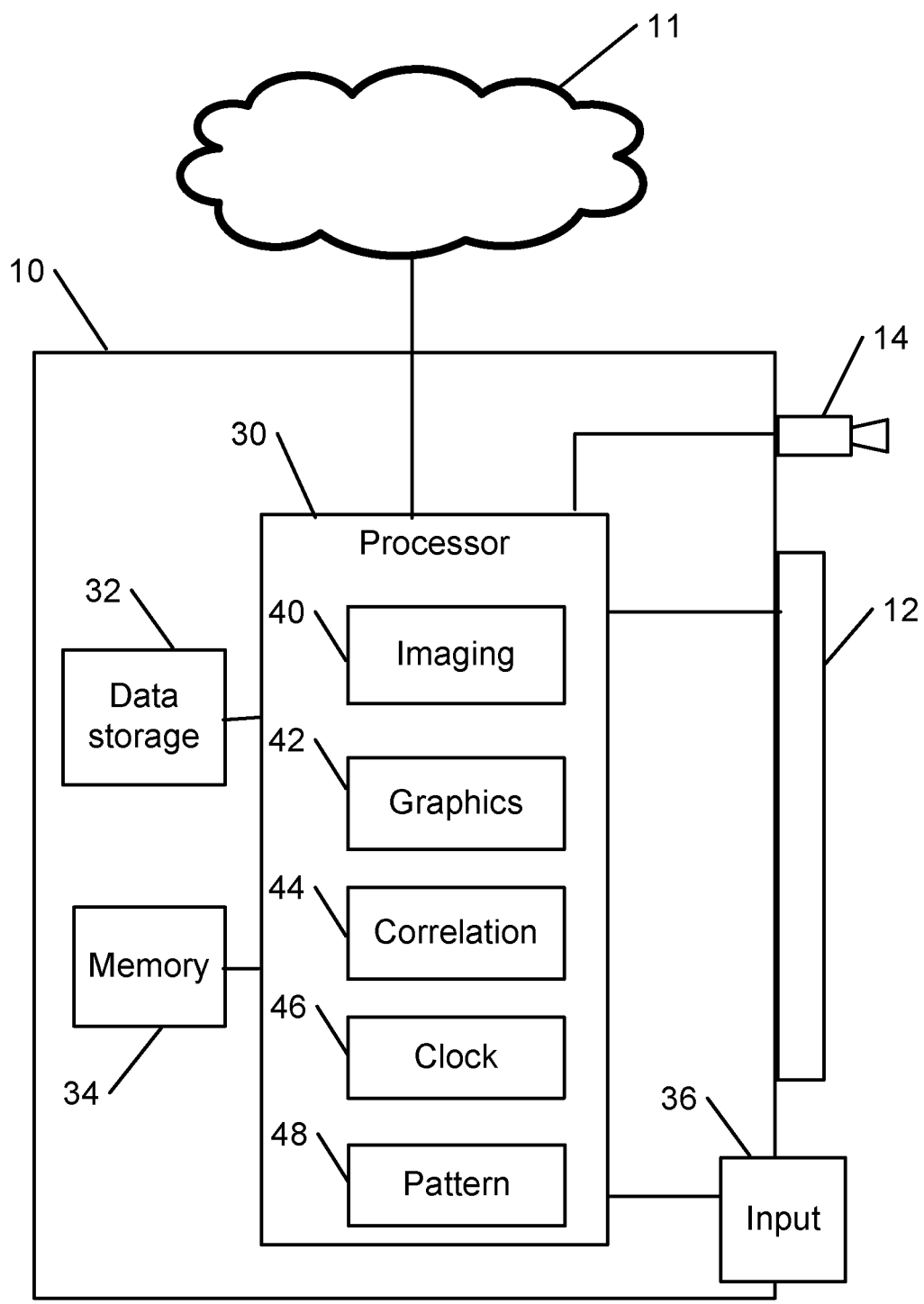
FIG. 2 is a schematic illustration of a device for use in gaze tracking, in accordance with an embodiment of the present invention.

FIG. 1 is a schematic illustration of use of a device for gaze tracking, in accordance with an embodiment of the present invention. FIG. 2 is a schematic illustration of a device for use in gaze tracking, in accordance with an embodiment of the present invention.

Gaze tracking device 10 is configured to track the gaze of user 20. Gaze tracking may be applied, for example, to verify viewing of displayed content. Gaze tracking device 10 may be further configured to perform gaze tracking calibration. Gaze tracking device 10 may include a mobile computing device (as shown in FIG. 1) such as a cellular or other mobile telephone, smartphone, tablet computer, handheld computer, laptop computer, or similar device. Gaze tracking device 10 may include a stationary computing device such as a desktop computer, terminal, workstation, an electronic billboard, or other device. Gaze tracking device 10 may include two or more physically separated intercommunicating units. For example, components of gaze tracking device 10 (e.g., eye tracker 14, display screen 12, processor 30, data storage device 32, memory device 34, input device 36, or other components) may be enclosed in different housings, may be placed in separate positions, may be geographically separated from one another, or otherwise be incorporated in separate devices.

Gaze tracking device 10 includes a device that is configurable to track an eye, eye tracker 14. Eye tracker 14 may include a camera, video camera, and sensor (e.g., infrared light-emitting diode and sensor) or other imaging or non-imaging device that may determine a position of an eye 22 or eye feature 24 of a user 20 of gaze tracking device 10 using for example visible light or other wavelengths of electromagnetic radiation. Eye tracker 14 may be incorporated into gaze tracking device 10 or may be in communication with processor 30 of gaze tracking device 10. Eye tracker 14 may be configured to acquire a sequence of video frames, or may be configured to acquire individual still images in close succession (e.g., 15 images per second). When gaze tracking device 10 is in typical operation, eye tracker 14 may be aimed or oriented such that a field of view of eye tracker 14 includes one or both of eyes 22 of user 20. In some cases, the field of view of eye tracker 14 may also include one or more additional facial features 26 of user 20 (e.g., a nose, eye-corner, mouth, eyebrow, forehead, temple, chin, hairline, or other facial feature).

Operation of eye tracker 14, e.g., to acquire an image or frame, may be controlled by processor 30. For example, an imaging module 40 operating on processor 30 may control acquisition of images or frames (the terms "image" and "frame" are used herein interchangeably). Acquisition of frames may be coordinated with a clock function 46 of processor 30. Acquired frames may be stored on memory device 34 or data storage device 32 of gaze tracking device 10. A time of acquisition of frames by eye tracker 14 may be determined by clock function 46. The time of acquisition of a frame may be stored in association with the frame on memory device 34 or data storage device 32.

Acquired frames may be analyzed by processor 30 (e.g., by imaging module 40 or other program being executed by processor 30). For example, processor 30 may analyze an acquired frame that includes an image of eye 22 to determine a position of an image of an eye feature 24 (e.g., a pupil, iris, or other feature) of eye 22. The position of eye feature 24 may be indicative of a gaze direction 28 of eye 22.

Gaze tracking device 10 includes a display screen 12. Display screen 12 may be operated by processor 30 (e.g., by a graphics module 42 or other program being executed by processor 30) to display content 17 that is viewable by user 20. Content 17 may include an advertisement, notice, message, game, website, user interface, or other type of content suitable for display on display screen 12. Display screen 12 may be operated by processor 30 to cause a moving object 16 to be displayed as moving with object image motion 18 across at least a portion of display screen 18. In some cases, display of moving object 16 may be associated with display of content 17. For example, display of moving object 16 may be concurrent with display of content 17. Moving object 16 may be displayed nearby or proximate to content 17. As used herein, display of moving object 16 nearby to content 17 refers to moving object 16 being incorporated into display of content 17 (e.g., be displayed as a part of content 17, or within a region of display screen 18 within which content 17 is displayed), adjacent to content 17, or otherwise near to content 17 such that moving object 16 may be viewed by a single user concurrently together with viewing of content 17.

Motion of the moving object 16 may be coordinated with clock function 46 such that the position of moving object 16 on display screen 18 is known at each instant of time. For example, a position of moving object 16 at each instant of time may be derivable from an algorithm or formula, or may be stored on memory device 34 or data storage device 32. Calibration data in the form of a correlation of a gaze position as a function of time may be stored, e.g., in the form of a data structure, a lookup table, in the form of a formula or equation, or otherwise. When a new calibration is performed, the stored calibration data may be updated, refreshed, or replaced.

Gaze tracking device 10 includes a processor 30. Processor 30 may include one or more intercommunicating processing units. Processing units may include, for example, a processing unit of a computer, a smartphone, a graphics card, or other type of processing unit. The processing units of processor 30 may be incorporated into a single gaze tracking device 10 or be enclosed by a single housing. One or more processing units of processor 30 may be located remotely from another of the processing units such that the processing units may intercommunicate via a network or other communications link. Processor 30 may be configured to operate in accordance with programmed instructions, e.g., as stored on memory device 34. Processor 30 may be operated to execute a program or application for gaze tracking calibration in accordance with an embodiment of the present invention.

An imaging module 40 may be executed by processor 30 to control acquisition of frames by eye tracker 14. Imaging module 40 may be executed to process a frame that is acquired by eye tracker 14. For example, a frame may be processed to identify an image of a user 20, an eye 22, an eye feature 22, a facial feature 26, or another object. A position of the identified object within the acquired frame may be identified. A frame may be analyzed to determine a distance of eyes 22 from eye tracker 14. For example, a distance may be determined relative to a previous distance by measuring an apparent distance between images of two identified objects (e.g., eye features 22, eyes 24, or facial features 26) in an acquired frame with the apparent distance in a previously acquired frame. An absolute distance may be determined using a rangefinder capability of gaze tracking device 10, or from comparison with a frame acquired when the distance from the imaged object to eye tracker 14 was otherwise known.

A graphics module 42 may be executed by processor 30 to control content that is displayed by display screen 12. For example, execution of graphics module 42 may cause a moving object image 16 to be displayed as moving with a motion 18 relative to content 17, display screen 12, or to displayed background content. Other objects, alphanumeric content, screen controls, or other content may be displayed.

A clock function 46 of processor 40 may be utilized in determining when to acquire a frame, when a frame was acquired, when to move moving object 16, where moving object image 16 was at a particular time (e.g., concurrent with acquisition of a particular frame), or when to perform or execute other actions.

A correlation module 44 may be executed to identify a correlation between an identified position of an image of an eye feature 24 and a position of moving object image 16. For example, in some cases it may be determined or assumed that user 20 was looking at moving object 16 (e.g., a motion or pattern of motions of eye feature 24 is consistent with smooth pursuit eye movement). In such a case, a position of an image of eye feature 24 in an acquired frame may be assumed to indicate a gaze direction 28 toward the position of displayed moving object image 16 concurrent with acquisition of that frame. Thus, the gaze point at the time of acquisition of the frame is assumed to substantially coincide with the concurrent position of moving object image 16. Additional determined correlations for other frames during smooth pursuit may enable correlation over a range of gaze directions 28. Such determined correlations may serve to calibrate gaze tracking.

Correlation module 44 may be provided with a temporal filtering capability to enable distinguishing and eliminating any effect of saccades on the identified position of eye feature 24 in a particular acquired frame.

A motion pattern module 48 of processor 40 may be executed to detect one or patterns of motion of eye feature 24. For example, motion pattern module 48 may be executed to identify a motion of eye feature 24 that is indicative of smooth pursuit eye movement.

When calibrated, an identified position of an image of an eye feature 24 in an acquired frame may be interpreted (e.g., using interpolation or extrapolation) to yield a calibrated gaze direction 28. Execution of imaging module 40 may be configured to utilize the calibration to determine a gaze direction 28 from an identified position of an image of eye feature 24 in an acquired frame.

Processor 30 may communicate with memory device 34. Memory device 34 may include one or more volatile or nonvolatile memory devices. Memory device 34 may be utilized to store, for example, programmed instructions for operation of processor 30, data or parameters for use by processor 30 during operation, or results of operation of processor 30. Memory device 34 may be utilized to store frames that are acquired by eye tracker 14, identified positions of images of eye feature 24 in each frame, a time of acquisition of each frame, positions of moving object image 16 as a function of time, calculated correlations, a calibration, or other results of operation of processor 30. Memory device 34 may be utilized to store a state or condition (e.g., a distance of user 20 from eye tracker 14, lighting condition, user identifying feature, or other state or condition) whose change may indicate a need to update or to perform anew a gaze tracking calibration procedure.

Processor 30 may communicate with data storage device 32. Data storage device 32 may include one or more fixed or removable nonvolatile data storage devices. For example, data storage device 32 may include a computer readable medium for storing program instructions for operation of processor 30. In this example, the programmed instructions may take the form of imaging module 40, graphics module 42, correlation module 44, or other instructions related to execution of a procedure for gaze tracking calibration or for utilizing results of gaze tracking calibration. It is noted that data storage device 32 may be remote from processor 30. In such cases data storage device 32 may be a storage device of a remote server storing imaging module 40, graphics module 42, correlation module 44, or other instructions in the form of an installation package or packages that can be downloaded and installed for execution by processor 30. Data storage device 32 may be utilized to store data or parameters for use by processor 30 during operation, or results of operation of processor 30.

Processor 30 may communicate with input device 36. For example, input device 36 may include one or more of a touch screen, pointing device, keyboard, keypad, or other component for enabling a user to input data or instructions for operation of processor 30.

Processor 30 may communicate with one or more remote devices or systems via network 11. For example, network 11 may represent a wired or wireless telephone network, an Internet connection, or another suitable network. A remote device may include a provider of content 17 for display on display screen 12. For example, content 17 may include an advertisement, message, notice, or alphanumeric or graphic content for display on display screen 12. Content 17 may include moving object 16.

Gaze tracking device 10 may include additional components or capabilities. For example, gaze tracking device 10 may include a communications capability to enable communication with remote devices via a network or other wired or wireless data link.

Processor 30 may be configured to execute a method for gaze tracking calibration, in accordance with an embodiment of the present invention.

Figure 3:
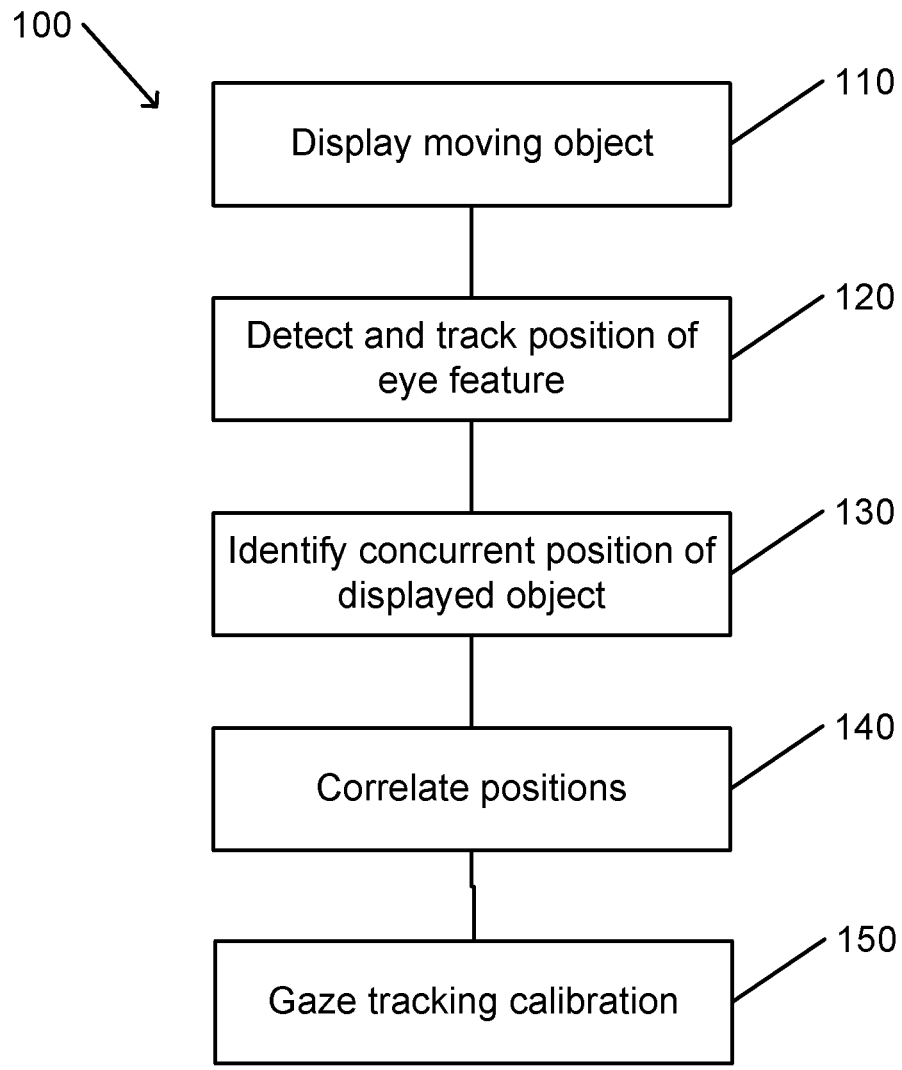
FIG. 3 is a flowchart depicting a method for gaze tracking calibration, in accordance with an embodiment of the present invention.

FIG. 3 is a flowchart depicting a method for gaze tracking calibration, in accordance with an embodiment of the present invention.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Gaze tracking calibration method 100 may be executed by a processor of a gaze tracking device, of another device that is in communication with a processor of a gaze tracking device, or of another device that is configured for gaze tracking calibration.

Execution of gaze tracking calibration method 100 may be initiated by a processor or other component of a gaze tracking device. For example, execution of gaze tracking calibration method 100 may be executed continuously (e.g., a moving object image may be constantly displayed on a display screen of the gaze tracking device). Execution of gaze tracking calibration method 100 may be performed periodically, e.g., at predetermined time intervals. For example, a time interval for execution of gaze tracking calibration method 100 may be selected to correspond to an experimentally determined typical time during which a gaze tracking calibration remains valid or accurate.

Execution of gaze tracking calibration method 100 may be performed in response to a predetermined event. Such an event may include detection of a change in environmental or operational conditions, a user-generated command or other intentional or unintentional user action, or another type of event. For example, an event may include powering-on of the gaze tracking device (or reactivation after being in a standby or sleep mode), initiating execution of a program or application that utilizes gaze tracking, a change in position or orientation of the gaze tracking device (e.g., as detected by an accelerometer, level, gyroscope, compass, or other sensor of the gaze tracking device), a change in the display (e.g., zooming in or out, or otherwise changing a size, color, brightness, resolution, contrast, or other relevant property of displayed content), a change in distance between the user's eyes and a camera of the gaze tracking device (e.g., as detected by image analysis of an image of the eyes, or by a rangefinder or other distance sensor), a change in illumination conditions (e.g., as detected by image analysis), a change in user behavior (e.g., closing and opening eyes, change in blinking rate, or other relevant change in behavior), a change in user (e.g., as detected by image analysis), operation of a user control (e.g., to deliberately initiate gaze tracking calibration, or to change a setting that is relevant to gaze tracking), or other relevant event that may compromise, affect, or impair a gaze tracking calibration.

Execution of gaze tracking calibration method 100 may be initiated whenever a suitably moving object image is displayed as part of operation of the gaze tracking device, concurrently with display of the moving object. For example, the moving object image may be displayed in the context of a game, animation, progress bar or indicator, onscreen timer, or other context.

An image of a moving object is displayed on a display screen that may be observed by a user (block 110). The object may be of sufficient size and brightness, and of an appropriate shape, form, or color, so as to cause or entice the user's eyes to follow the object. For example, the form of the object may be such as to be readily distinguishable from a displayed background or to be of interest to the user (e.g., within a context of other displayed content). The speed or rate of the motion may be sufficiently slow so as to induce the user's eyes to follow the object with a smooth pursuit eye movement (e.g., with few or no saccadic eye movements). Motion of the object image may be in a single direction only, or may at times reverse its direction (e.g., upon reaching an edge of the display screen). Motion in various directions (e.g., perpendicular or at an oblique angle to the original direction of motion) may enable calibration of gaze tracking in more than one dimension. The moving object displayed during one repetition or execution of gaze tracking calibration may be different or other than an object displayed during another repetition or execution of gaze tracking calibration.

During the motion, a position of the moving object image (e.g., in screen coordinates, coordinates relative the user's eyes, or in another coordinate system) may be recorded or stored as a function of time (e.g., in the form of a table or data structure). Alternatively or in addition, parameters of a functional description of the motion (e.g., starting point and speed of linear motion, or other appropriate parameters) may be stored.

A position of a feature of one or more eyes of the user may be detected (block 120). For example, a sequence of positions of the eye feature as the eye moves in smooth pursuit following the displayed moving object image may be detected and stored. A time that the eye is at each detected position may be stored in association with (e.g., as a time stamp of) the identified position (or with a video frame or other data from which the identified position is extracted), or otherwise be made available to a processor that is executing gaze tracking calibration method 100.

Alternatively or in addition, the detected positions of the eye feature as a function of time may be represented by a functional form (e.g., by fitting, such as least squares fitting, to a linear or other functional form), or otherwise parameterized. For example, fitting to a smooth functional form may filter out any deviations from smooth pursuit eye movement (e.g., may reduce or eliminate any effects of saccadic eye movement).

The feature of the eye is a feature whose position may be indicative of a gaze direction of the eye. For example, the feature may include a pupil, uvea, iris, or other feature of the eye that rotates in coordination with the eye when the eye is turned, moved, or rotated relative to the user's face.

For example, a sequence of video frames that each includes an image of the user's eyes may be acquired by an imaging camera. Image analysis applied to each acquired frame may yield a position of an image of the eye feature within each frame. In some cases, a rate of acquisition of video frames may be adjusted (e.g., increased) when gaze direction calibration is initiated or is about to be initiated.

As another example, an appropriate radiation source (e.g., infrared light-emitting diode or other source) and an appropriate sensor may detect a position of a pupil. A sensor may rely on visible light.

In accordance with an embodiment of the present invention, storing or recording detected eye feature positions may commence after eye movement that is consistent with smooth pursuit is detected or identified. For example, smooth pursuit may be detected when level of deviations from a smooth linear or other functional representation of smooth pursuit eye movement is less than a predetermined minimum or threshold value.

For a detected position of the eye feature, a concurrent position of the displayed moving object image is identified (block 130). For example, a time stamp of each detected position of the eye feature may be used to retrieve a position of the moving object image at the same time (e.g., with a precision as allowed by the coordination of synchronization between the eye position detection and the display of the moving object image). The time stamp may be used to retrieve the position of the object image from a lookup table, database, or other indexed storage. Interpolation or extrapolation between stored object image positions may be utilized to calculate the position at the time of the time stamp. The time stamp value may be inserted into a function or other formula to calculate a position of the object image at the time of the time stamp.

Detected positions of the eye feature may be correlated with the identified positions of the concurrent positions of the displayed moving object image (block 140). For example, a determined correlation between the identified positions of the eye feature and of the moving object image may be represented by a lookup table or other form of indexed list or table. As another example, a determined correlation between the identified positions of the eye feature and of the moving object image may be expressed in a functional (e.g., linear or other functional) form. The correlation may be understood as indicating the point on the display screen at which the user is looking when the user's eye feature is detected at a particular position.

Execution of gaze tracking calibration method 100 may result in a gaze tracking calibration (block 150). The gaze tracking calibration may include, be based on, or may be identical with the determined correlations. After completion of a execution gaze tracking calibration method 100, the gaze tracking calibration may be applied to an identified position of a user's eye feature to determine a point or points on the display screen at which the user is looking. For example, during operation of a device, a position of the user's eye feature may be tracked on a continual basis. Gaze tracking calibration may then be applied to the tracked position to continually identify the gaze point at which the user is looking.

The gaze tracking calibration may be stored for use during a gaze tracking operation. The stored gaze tracking calibration may replace a previously stored gaze tracking calibration. Alternatively or in addition, previously stored gaze tracking calibration results may be stored in an archive (e.g., for later retrieval for diagnostic or research purposes).

Identification of the gaze point at which the user is looking may be utilized in controlling operation of a device that is configured for gaze tracking calibration. For example, display scrolling or other operations of the device may be activated or controlled in accordance with an identified gaze point.

In some cases, gaze tracking calibration may be considered to be valid only for a particular relative distance and orientation between the user's eyes on the one hand, and the display screen or camera of the device on the other.

In some cases, a gaze tracking calibration may be configured to apply to a range of distances between the user's eyes and the display screen, or to different relative orientations between the eyes and the display screen. In this case, eye tracking during operation of the device or an application of the device may include continually identifying a distance between the eyes and the device, or a relative orientation between the eyes and the device. Application of gaze tracking calibration may include adjusting a tracked position of the eyes, or a resulting identified gaze point, for detected changes in distance or orientation. For example, a movement of an eye feature when the display screen is 50 centimeters away from the user's eyes may be twice as large as when the distance to the display screen is one meter.

Processor 30 may be configured to execute a method for view verification of displayed content, in accordance with an embodiment of the present invention.

Figure 4:
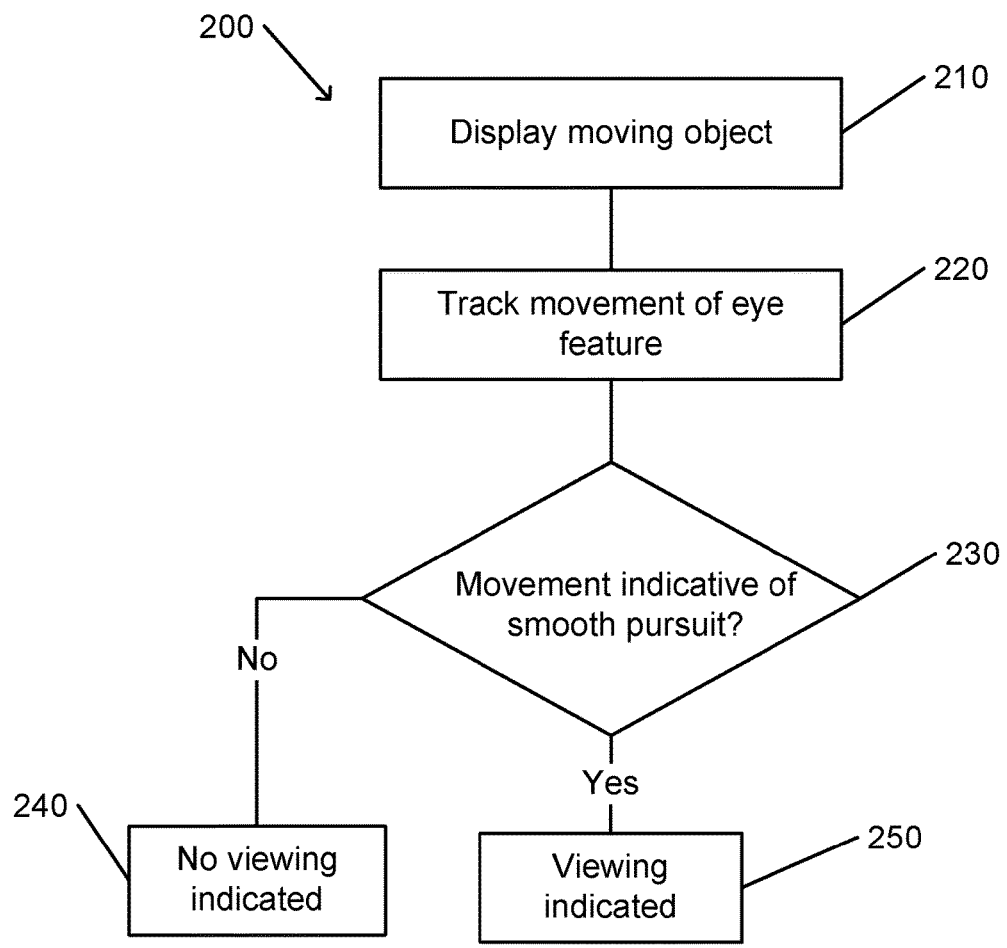
FIG. 4 is a flowchart depicting a method for view verification, in accordance with an embodiment of the present invention.

FIG. 4 is a flowchart depicting a method for view verification, in accordance with an embodiment of the present invention.

View verification method 200 may be executed by a processor of a gaze tracking device, of another device that is in communication with a processor of a gaze tracking device, e.g., via a network, or of another device that is configured for view verification.

Execution of view verification method 200 may be initiated by a processor or other component of a gaze tracking device, or by a remote device that provides content for display on the gaze tracking device. For example, execution of view verification method 200 may be executed continuously (e.g., a moving object image may be constantly displayed on a display screen of the gaze tracking device) when content to be viewed is displayed. Execution of view verification method 200 may be performed periodically, e.g., at predetermined time intervals. Execution of view verification method 200 may be performed in response to a predetermined event. Such an event may include beginning of display of content to be viewed.

An image of a moving object is displayed on a display screen that may be viewed by a user concurrent with display of the displayed content (block 210). The object may be of sufficient size and brightness, and of an appropriate shape, form, or color, so as to cause or entice the user's eyes to follow the object. For example, the form of the object may be such as to be readily distinguishable from a displayed background or to be of interest to the user (e.g., within a context of other displayed content). The speed or rate of the motion may be sufficiently slow so as to induce the user's eyes to follow the object with a smooth pursuit eye movement (e.g., with few or no saccadic eye movements). Motion of the object image may be linear in a single direction only, or may at times reverse its direction (e.g., upon reaching an edge of the display screen). The path of motion may be horizontal, vertical, diagonal, zigzagged, or curved. Motion of the object may follow a circular, elliptical, or otherwise shaped closed path. The moving object displayed during one repetition or execution of view verification may be different or other than an object displayed during another repetition or execution of view verification.

A movement of a feature of one or more eyes of the user may be tracked (block 220). For example, a sequence of positions of the eye feature as the eye follows the displayed moving object image may be detected and stored. The feature of the eye may be a feature whose position is indicative of a gaze direction of the eye. For example, the feature may include a pupil, uvea, iris, or other feature of the eye that rotates in coordination with the eye when the eye is turned, moved, or rotated relative to the user's face.

For example, a sequence of video frames that includes an image of the user's eyes may be acquired by an imaging camera. Image analysis applied to acquired frames may yield a position of an image of the eye feature within each frame. In some cases, a rate of acquisition of video frames may be adjusted (e.g., increased) when view verification is initiated or is about to be initiated.

As another example, an appropriate radiation source (e.g., infrared light-emitting diode or other source) and an appropriate sensor may detect a position of a pupil. A sensor may rely on visible light.

The tracked movement of the eye feature may be analyzed to determine whether or not the tracked movement is consistent with, or indicative of, the user's eyes following the object's motion (block 230). Analysis of the tracked movement may indicate whether or not the tracked movement was concurrent with the motion of the displayed moving object. Analysis of the tracked movement may indicate whether or not the user's eyes are moving with smooth pursuit eye movement. Analysis may identify whether the tracked movement deviates from an expected path consistent with smooth pursuit. For example, a functional representation of an eye movement consistent with smooth pursuit may be fitted (e.g., using a least squares or other fitting technique) to the tracked movement. If a deviation of the tracked movement does not deviate (e.g., in the form of saccades or other deviations) from the functional representation by more than a threshold amount, the tracked movement may be considered to be consistent with smooth pursuit.

In some cases, a measured distance of the user's eyes from the display screen may be considered in determining consistency of the tracked eye movement with following of the object (e.g., smaller eye movements when the screen is more distant from the eyes).

If the movement is not consistent with following the object, viewing of the object, and thus of the displayed content, is not indicated (block 240). For example, no tracked movement that is concurrent with the motion of the displayed object may have been detected. A calculated deviation of the tracked movement from a representation of smooth pursuit may have exceeded a threshold value.

If the movement is consistent with following the object, viewing of the object, and thus of the displayed content, is indicated (block 250). For example, tracked movement that is concurrent with the motion of the displayed object may have been detected. A calculated deviation of the tracked movement from a representation of smooth pursuit may have been less than a threshold value.

Indication or lack of indication of viewing may be reported, e.g., via a network, to a relevant party. For example, the relevant party may include a provider of the displayed content. The results of analysis may be stored for later reporting to the relevant party.

In accordance with an embodiment of the present invention, displaying a moving object while concurrently tracking an eye feature may be utilized to concurrently or successively calibrate gaze tracking and verify viewing of displayed content. For example, when smooth pursuit movement of a user's eye is identified by eye tracking concurrently with display of the moving object, viewing of concurrently (and located nearby) content may be determined. In addition, a correlation of a tracked eye feature with a concurrent position of the moving object may be utilized to correlate the gaze tracking.

The invention claimed is:

1. A method for calibrating a gaze of a viewer of an electronic screen, the method comprising:
displaying a moving object on said electronic screen during a time period;
acquiring during said time period a plurality of images of an eye of said viewer of said screen, wherein a rate of movement of said moving object on said screen is associated with a rate that induces smooth pursuit of said eye in gazing at said moving object;

identifying a pattern of movements of said eye during said time period, said pattern indicative of viewing by said eye of the moving object;

determining that the viewer has viewed content that is displayed concurrently with the moving object upon the identifying of the pattern, wherein the identified pattern is an indication of smooth pursuit movement of the eye; and calibrating a gaze point of said eye during said time period with a position on said screen of said moving object during said time period.

2. The method of claim 1, wherein the pattern of movements of said eye comprises a movement of a pupil or an iris of said eye.

3. The method as in claim 1, wherein said calibrating comprises associating said gaze point of said eye from an image of said plurality of images with said position of said object on said screen at a time of acquisition of said image of said plurality of images.

4. The method as in claim 1, comprising storing calibration data derived from said calibration and replacing said stored calibration data upon a repetition of said method.

5. The method as in claim 1, comprising selecting said object from among a group of objects that are contextually related to a scene displayed to said user on said screen during said time period.

6. The method as in claim 1, comprising repeating said method, wherein said object displayed in a repetition of said method is different from said object that was displayed in a previous execution of said method.

7. The method as in claim 1, comprising repeating said method at least one of: upon a signal from a processor that said calibration of said gaze of said viewer has been compromised, and at a fixed periodicity during a period of an operation of a gaze tracking function associated with said screen.

8. The method as in claim 1, wherein said displaying is unaccompanied by a signal to said viewer to look at said moving object.

9. The method of claim 1, further comprising:
identifying a deviation of the tracked movement from a representation of smooth pursuit; and
calculating if the deviation exceeded a threshold value.

10. The method of claim 1, further comprising identifying a correlation between said identified pattern and the position on said screen of said moving object.

11. A method for determining if a user of an electronic display screen has viewed content that is displayed on the screen, the method comprising:
displaying on the screen a moving object concurrent with a time period during which the content is displayed;
acquiring during said time period a plurality of images of an eye of said user, wherein a rate of movement of said moving object on said screen is associated with a rate that induces smooth pursuit of said eye in gazing at said moving object;
identifying a pattern of movements of said eye during said time period, said pattern indicative of viewing by said eye of the moving object; and
determining that the user has viewed content that is displayed concurrently with the moving object upon identifying said pattern of movement of said eye that is indicative of smooth pursuit by said eye during said time period.

12. The method of claim 11, wherein the content comprises an advertisement.

13. The method of claim 11, wherein the moving object is displayed on the screen proximate to the content.

14. The method of claim 11, further comprising calibrating a gaze point of said eye during said time period with a position on said screen of said moving object during said time period.

15. A gaze tracking device comprising:
a display screen;
an eye tracker to track movement of an eye of a user who is viewing the screen;
a processor in communication with a non-transitory computer readable medium, wherein the non-transitory computer readable medium contains a set of instructions wherein the processing unit is configured to carry out the set of instructions to:
display on the screen a moving object while concurrently operating the eye tracker to track movement of the eye, wherein a rate of movement of said moving object on said screen is associated with a rate that induces smooth pursuit of said eye in gazing at said moving object;
concurrently with the display of the object, operate the eye tracker to detect a plurality of successive positions of a feature of the eye of the user;
identify a movement of the eye that is indicative of viewing of the object;
determine that the user has viewed content that is displayed concurrently with the moving object upon the identification of the movement of the eye, wherein the identified movement is an indication of smooth pursuit movement of the eye; and
calibrate a gaze point of the eye by associating a tracked position of the eye feature with a concurrent position of the object.

16. The device of claim 15, wherein the eye tracker comprises a camera that is configured to acquire an image of the eye when the user is viewing the screen.

17. The device of claim 15, wherein the processor is further configured to carry out the set of instructions to determine that the user has viewed content that is displayed on the screen concurrently with the moving object upon identifying said movement of the eye.

18. The device of claim 17, wherein the content comprises an advertisement.

19. The device of claim 17, wherein the object is displayed proximate to the content.

* * * * *